Feb. 7, 1928.

P. S. LARSON 1,658,604

GRAIN CLEANER

Filed Nov. 20, 1925

INVENTOR.
PETER S. LARSON.
BY HIS ATTORNEYS.
Williamson Reif & Williamson

Patented Feb. 7, 1928.

1,658,604

UNITED STATES PATENT OFFICE.

PETER S. LARSON, OF MINNEAPOLIS, MINNESOTA, ASSIGNOR OF ONE-HALF TO ANTHONY B. SPARBOE, OF MINNEAPOLIS, MINNESOTA.

GRAIN CLEANER.

Application filed November 20, 1925. Serial No. 70,303.

This invention relates to grain separators or cleaners and especially to those constructed to repeat the run of the grain over a series of sieves. In most commercial cleaners in use at this time the uncleaned grain is delivered to the topmost of a series or gang of inclined sieves, through which kernels of grain pass as well as a considerable amount of oats and undesirable material. A substantial proportion of the material and grain passing through this gang is returned to the top of the separator through the repeat spout and goes through the repeat run over said gang of sieves. Obviously, the return of this large amount of material including a considerable amount of oats and other undesirable material clogs the sieves in the regular run or gang and, of necessity, lessens the co-efficiency of the sieves in connection with the usual fans in separating the kernels of grain.

It is the main object of this invention to provide a highly efficient grain separator or attachment for a standard grain separator which will greatly increase the capacity and speed of standard devices of this nature commercially sold at this time.

A further object of the invention is to provide in a grain separator having an elevator and a repeat delivery spout connected thereto, simple but efficient means for removing the greater part of undesirable material from the repeat run before the repeat material reaches the regular run or gang, and, moreover, for delivering the repeat grain to the forward end or starting point of the regular run rather than to the intermediate portion of the top sieve of the gang as is the case in most cleaners. The sieves of the regular gang will thus be practically unclogged by any repeat material and will be in condition to handle the uncleaned grain delivered from the hopper much faster and with greater efficiency. Furthermore, by delivering cleaned grain from the repeat run to the forward end of the top sieve of the regular run, the weight of the heavier kernels of cleaned grain will more quickly push off the oats, chaff and other undesirable material as they slide down and through the sieves.

The invention has for its object to provide efficient auxiliary cleaning means disposed beneath the delivery end of the repeat spout adapted to remove said undesirable material from the separator or cleaner and provided with a chute or deck therebeneath adapted to collect the grain passing through said auxiliary cleaning means and return the same to the starting point of the regular run.

Figure 1:
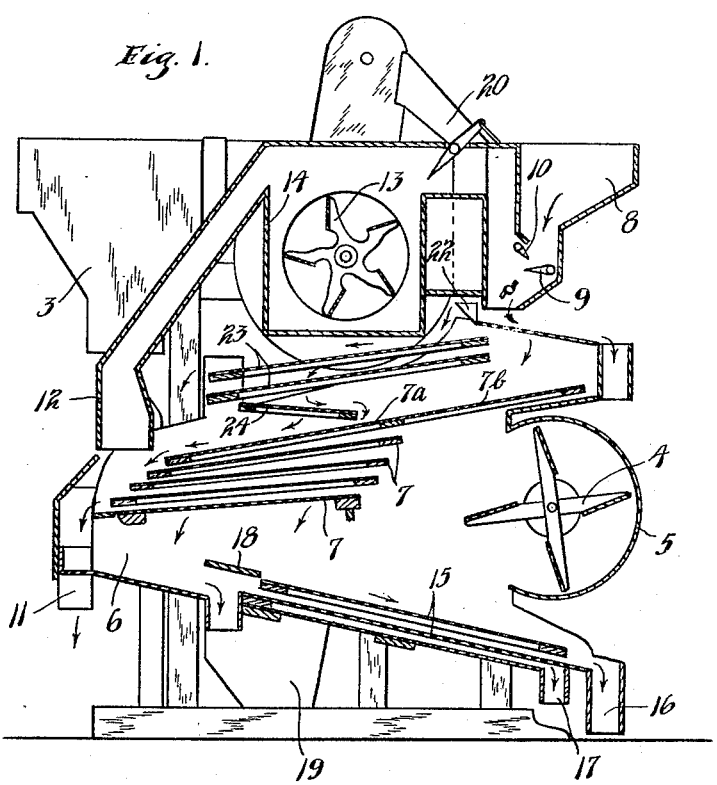
Figure 2:
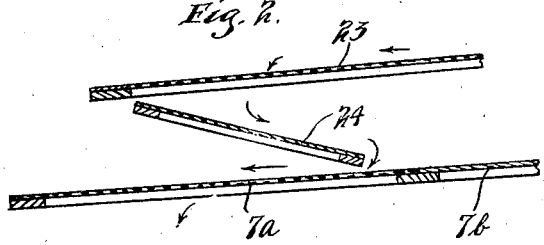

These and other objects of the invention will be apparent from the following description made in connection with the accompanying drawings wherein like characters refer to similar parts throughout the several views, and in which Fig. 1 is a longitudinal vertical section of an embodiment of the invention, and Fig. 2 is a detailed fragmentary vertical section on a larger scale showing the relative position and construction of the auxiliary screening means.

In the drawings, a suitable upright frame 3 is provided having the usual fan 4 driven within the casing 5. A movable shoe 6 has mounted therein a plurality of transversely disposed inclined sieves 7 forming the regular run, the upper one of which, 7ª, is continuously connected to a deck 7ᵇ lying preferably in the same plane and extending beneath the delivery hopper 8 in position to receive grain therefrom. Sieves 7 are spaced apart in the usual way, there being greater distance between their respective forward ends than between their respective rear ends. Hopper 8 is provided with the usual feed gates 9 and 10, respectively, adapted to control the admission of grain into the cleaner. The tailing spout 11 is provided in the rear end of the machine adapted to receive the oats and other tailings from the rear ends of the sieves 7.

A tubular casing 12, having an enlarged receiving throat, is mounted in frame 3 above and behind the rear end of sieves 7 communicating with the fan 13 driven within the casing 14 at the top of the machine. The enlarged throat of casing 12 is directly above the rear ends of the sieves 7 in position to suck up the chaff and lighter material driven off the said sieves. Adjacent the bottom of shoe 6 a pair of forwardly inclined sieves 15 are disposed, the top screen being of considerably larger mesh than the lower screen. The cleaned grain will slide down the upper screen 15 through the spout 16 and the fine screenings or seed will sift through the lower or finer screen 15 and be delivered through spout 17.

A repeat board 18 of usual construction is disposed beneath the regular gang of sieves 7, variable in its lateral position to regulate the amount of the grain received in an elevator 19. Elevator 19 carries the grain and material deposited therein which has previously sifted through sieves 7 to the top of the machine through a depending repeat spout 20, the delivery end of which lies above a repeat spreader device 22 of standard form extending horizontally across the forward end of the machine and disposed a short distance from the rear of the delivery end of hopper 8 and adapted to cooperate with one side of the lower end of hopper 8 to deliver the grain therefrom in a thin sheet.

Below the spreader device the applicant provides a plurality, preferably a pair, of substantially parallel spaced inclined sieves 23 supported by and across the shoe 6 and preferably extending above the regular gang of sieves 7. The forward ends of sieves 23 are disposed at a higher level than the rear ends and said sieves extend from beneath the delivery point of the repeat grain to approximately the end of the regular run. Beneath the lower sieve 23 a slide or deck 24 is provided preferably secured to shoe 6 and extending from a line just below the rear end of lower sieve 23 to a line just above the forward end of the topmost sieve 7ª of the regular run. Slide 24 has its rearward end disposed at a higher level than its forward end whereby the grain screened by sieves 23 will be delivered to the starting point of the regular cleaning run.

It may be readily be seen that applicant's invention will not require the building of a complete new grain separator unless desired since, by merely removing the top sieve of the regular gang employed in most standard cleaners to provide additional space, the auxiliary sieves 23 and deck 24 may be installed as an attachment to most forms of cleaners provided for a repeat run of grain.

*Operation.*

While the operation of applicant's device is probably obvious from the foregoing description, the many advantages and the results attained thereby, may not be as readily observed.

The unscreened grain in the regular run falls upon the deck 7ᵇ connected with the uppermost sieve 7ª, the fan 4 driving out a large portion of the chaff, oats and other light material, the lightest material being sucked up and removed by means of the fan 13. A great portion of the screened grain and other material falls into the lower portion of the elevator 19 for the repeat run while the kernels of grain dropping through the forward portion of the lower sieve 7 fall upon the screens 15, the finer screenings and seeds going through and out of the machine by the spout 17 and the cleaned grain being delivered through trough 16. The repeat grain and material is delivered from the elevator 19 through the repeat spout 20 and spread out by means of the device 22 dropping to form a comparatively even sheet upon the top auxiliary sieve 23. Sieves 23 take off the greater amount of the oats, chaff and other undesirable material and the screened grain and such small amounts of other material as may get through these sieves is delivered in a thin even sheet by slide or deck 24 to the extreme forward end of the topmost sieve 7ª of the regular run, and, thus, the regular run is not impeded and clogged by having a great mass of oats and undesirable material thrown thereon but will be practically freed of such material as far as the repeat grain is concerned. Sieves 7 will thus function much more efficiently and the grain will be more quickly separated by the use of applicant's device.

Moreover, the weight of the cleaned grain falling on the regular run of sieves and rolling theredown assists in throwing off the lighter or undesirable material in the first run over sieves 7. Applicant has made careful tests with this device in separating wheat, and has found that, whereas, a standard separator will return approximately 25% of wheat and 75% of oats and other material, by the use of his device 75% of wheat is returned on the repeat run to the forward end of the topmost sieve of the regular run and only 25% other material.

From the above description, it will be seen that applicant has invented a highly useful improvement in grain separators and cleaners capable of speeding up the action of such devices and consequently greatly increasing the capacity and efficiency of the same.

It will, of course, be understood that various changes may be made in the form, details, proportions and arrangement of parts without departing from the scope of the invention.

What is claimed is:

1. In a grain separator a main gang of inclined sieves, means for delivering uncleaned grain on the upper sieve of said gang, a repeat elevator adapted to receive a considerable portion of the material passing through said main gang, distributing means below the upper end of said elevator adapted to deliver the repeat grain in a thin sheet, an inclined auxiliary screen disposed between said distributing means and the upper sieve of said main gang adapted to remove a large amount of the undesirable material from the run, and permit the heavier desirable material to pass therethrough and a deck or chute disposed between said auxiliary screen and the upper sieve of said gang adapted to collect said heavier material and distribute the same in a substantially even sheet at the forward end of the upper sieve of said main gang, whereby the same will assist in throwing off the lighter material from the regular run.

2. In a grain separator, a main gang of separator sieves, means for delivering uncleaned grain to the upper sieve of said gang, a return run elevator adapted to receive a considerable portion of the main run of material passing through said main gang, means to which said elevator is adapted to deliver for removing a large amount of the lighter material in said return run before redelivery to said gang and means for delivering the heavier desirable material in said return run to the upper portion of the upper sieve of said gang.

3. In a grain separator, a main gang of separator sieves, means for delivering uncleaned grain to the upper sieve of said gang, a return run elevator adapted to receive a considerable portion of the main run of material passing through said main gang, auxiliary screening means to which said elevator is adapted to deliver and which is adapted to remove a large amount of the lighter undesirable material in the return run before delivery of the same to said gang, and means for directing the heavier desirable material in said return run to the receiving end of the upper sieve of said main gang whereby the same will assist in throwing off the lighter undesirable material in the main run.

In testimony whereof I affix my signature.

PETER S. LARSON.